US012734535B2

(12) United States Patent
Jung

(10) Patent No.: US 12,734,535 B2
(45) Date of Patent: Sep. 15, 2026

(54) CONTENTS CONTAINER OF WHICH HEAD PART IS RAISED AND LOWERED BY ROTATION

(71) Applicant: YONWOO CO., LTD., Incheon (KR)

(72) Inventor: Hyo Sun Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 91 days.

(21) Appl. No.: 18/850,972

(22) PCT Filed: Mar. 21, 2023

(86) PCT No.: PCT/KR2023/003727
§ 371 (c)(1),
(2) Date: Sep. 25, 2024

(87) PCT Pub. No.: WO2023/200132
PCT Pub. Date: Oct. 19, 2023

(65) Prior Publication Data
US 2025/0222475 A1 Jul. 10, 2025

(30) Foreign Application Priority Data
Apr. 11, 2022 (KR) ........................ 10-2022-0044380

(51) Int. Cl.
*B05B 11/00* (2023.01)
*B65D 83/76* (2006.01)

(52) U.S. Cl.
CPC ........ *B05B 11/0038* (2018.08); *B65D 83/765* (2025.01); *B65D 2583/005* (2013.01)

(58) Field of Classification Search
CPC ............... B05B 11/0032; B05B 11/028; B05B 11/0038; B05B 11/1059; B05B 11/1074
USPC ................. 222/153.13, 321.7, 384, 182, 183
See application file for complete search history.

(56) References Cited

U.S. PATENT DOCUMENTS 4,479,589 A * 10/1984 Ford ..................... B05B 11/106 222/321.9
6,422,425 B1 * 7/2002 Tada ................... B05B 11/1094 222/153.07
9,010,581 B2 * 4/2015 Presche ................... B05C 11/00 222/384
9,757,751 B2 * 9/2017 Chen ................... B05B 11/0032
(Continued)

FOREIGN PATENT DOCUMENTS

CN 202043782 U 11/2011
CN 110203543 A 9/2019
(Continued)

*Primary Examiner* — Charles P. Cheyney
(74) *Attorney, Agent, or Firm* — Bridgeway IP Law Group, PLLC; Sang Ho Lee; Hyun Woo Shin

(57) ABSTRACT

A contents container includes an inner container assembly which accommodates contents and discharges the contents to the outside by application of pressure, and an outer container assembly which accommodates the inner container assembly, wherein the outer container assembly may comprise: an outer container provided so as to surround at least a portion of the inner container assembly; a connection part which connects the outer container and the inner container assembly, and raises and lowers the inner container assembly by being raised and lowered along the outer container when rotated; and a rotation part which raises and lowers the connection part by a rotation operation.

18 Claims, 8 Drawing Sheets

(56) References Cited

U.S. PATENT DOCUMENTS

| | | | | |
|---|---|---|---|---|
| 11,084,646 | B1 * | 8/2021 | Hwang | B05B 11/0054 |
| 11,192,126 | B2 * | 12/2021 | Shim | B05B 1/30 |
| 12,150,537 | B2 * | 11/2024 | Lee | A45D 34/00 |
| 2009/0071985 | A1 * | 3/2009 | Ki | B05B 11/1008 222/256 |
| 2009/0120963 | A1 * | 5/2009 | Bae | B05B 11/1074 222/153.13 |
| 2011/0031282 | A1 * | 2/2011 | Hagen | B05B 11/1021 222/321.7 |
| 2016/0037890 | A1 | 2/2016 | Chen | |
| 2018/0361413 | A1 * | 12/2018 | Ruan | A45D 34/00 |
| 2024/0269697 | A1 * | 8/2024 | Zembrod | B05B 11/0097 |
| 2025/0170601 | A1 * | 5/2025 | Wu | B05B 11/1049 |

FOREIGN PATENT DOCUMENTS

| | | | |
|---|---|---|---|
| EP | 4353364 | A1 | 4/2024 |
| JP | H06-345164 | A | 12/1994 |
| JP | H08-182946 | A | 7/1996 |
| JP | 2001-192054 | A | 7/2001 |
| JP | 2016-011139 | A | 1/2016 |
| JP | 2020-019518 | A | 2/2020 |
| KR | 20-0311494 | Y1 | 5/2003 |
| KR | 20-0347811 | Y1 | 4/2004 |
| KR | 10-2010-0001801 | U | 2/2010 |
| KR | 10-1666683 | B1 | 10/2016 |
| KR | 10-2017-0136686 | A | 12/2017 |
| KR | 10-1966154 | B1 | 4/2019 |
| WO | 2012/161408 | A1 | 11/2012 |

* cited by examiner

CONTENTS CONTAINER OF WHICH HEAD PART IS RAISED AND LOWERED BY ROTATION

TECHNICAL FIELD

The present disclosure relates to a contents container of which a head part is raised and lowered by rotation, and more specifically, to a contents container which facilitates the separation of an inner container from an outer container and refilling of contents and has an improved pressure-limiting structure.

BACKGROUND ART

Contents containers have various structures depending on the formulation of contents accommodated therein and usage methods. For example, contents in liquid, gel, or cream form can be accommodated in a pump container that discharges the contents externally by pressure.

Such a pump container typically includes: a container part accommodating the contents; a pump assembly which is compressed and decompressed by pressure to move the contents; and a head part which presses the pump assembly to discharge the contents externally. However, the pump container has several disadvantages in that the head part is often unintentionally pressed, causing the contents to be discharged, and in that there is a limitation in design of the container since the head part is always exposed externally.

To overcome the problems of the pump container, containers of which the head part is raised and lowered by rotation has been developed. However, even in the lift-type container, when a specific area of the head part is pressed, the head part may partially descends despite being in a pressure-limited state, causing some of the contents to be discharged. Furthermore, the lift-type container has a complex structure, so it is difficult to apply a structure allowing for refilling of the contents, and even if a refill configuration is applied, the operation process for refilling the contents is complicated and productivity is reduced due to the complicated assembly process.

DISCLOSURE

Technical Problem

Accordingly, the present invention has been made in view of the above-mentioned problems occurring in the related art, and it is an object of the present invention to provide a contents container of which a head part is raised and lowered by rotation, and which facilitates the separation of an inner container from an outer container and refilling of contents and has an improved pressure-limiting structure.

The technical objects of the present invention are not limited to those mentioned above, and other technical objects not mentioned will be clearly understood by those skilled in the art from the following descriptions.

Technical Solution

According to an embodiment of the present invention, a contents container is provided. The contents container includes: an inner container assembly which accommodates contents and discharges the contents to the outside by application of pressure; and an outer container assembly which accommodates the inner container assembly, wherein the outer container assembly may include: an outer container provided to surround at least a portion of the inner container assembly; a connection part which connects the outer container and the inner container assembly, and raises and lowers the inner container assembly by being raised and lowered along the outer container when rotated; and a rotation part which raises and lowers the connection part by a rotation operation.

Moreover, the upper surface of the inner container assembly is located at a height corresponding to the upper surface of the outer container assembly, and when the rotation part is rotated, the upper surface of the inner container assembly protrudes above the upper surface of the outer container assembly.

Furthermore, a wing part protrudes along the outer circumferential surface of the upper end of the inner container assembly, and a first limitation protrusion being in contact with the lower end of the wing part protrudes along the inner surface of the upper end of the rotation part.

Additionally, the wing part is formed to incline inwardly downward.

In addition, the inner container assembly includes a nozzle part which discharges the contents, and the nozzle part is formed to incline inwardly downward at an angle corresponding to the wing part.

Moreover, the outer container includes at least one first guide groove, the rotation part includes at least one second guide groove, and the connection part includes at least one guide protrusion inserted into the first guide groove and the second guide groove.

Furthermore, during the rotation of the rotation part, the guide protrusion moves along the first and second guide grooves, so that the connection part rises along the outer container.

Additionally, the first guide groove is formed in a spiral direction relative to the cross-section of the outer container, and the second guide groove is formed in a perpendicular direction relative to the cross-section of the rotation part.

In addition, the inner container assembly comprises: an inner container accommodating the contents; a pump assembly moving the contents by pressurization; and a head part discharging the contents externally.

Moreover, the inner container assembly further comprises a stopper positioned between the head part and the pump assembly to prevent pressurization of the head part.

Furthermore, the pump assembly comprises: a pump part which is compressed and decompressed by pressurization to move the contents; and an undercap which connects the pump part to the outer container assembly.

Additionally, an undercut which is in contact with one side of the connection part is formed on the outer side of the undercap.

Moreover, the inner container assembly is separated from the outer container assembly by gripping the undercut.

In addition, the inner container assembly is formed generally of the same material.

Advantageous Effect

According to the present invention, as the inner container assembly rises and falls by rotation, it is easy to separate the inner container assembly from the outer container. Therefore, while maintaining the outer container assembly, the entire inner container assembly can be replaced with a new inner container assembly for use, thereby facilitating the refilling of contents and allowing for the reuse of the outer container assembly. Additionally, if the entire inner container assembly is formed of the same material, the inner container assembly can be easily separated and discharged, providing the recycling convenience.

Furthermore, according to the present invention, when the head part descends to limit pressure, lowering is restricted even if any area of the head part is pressed, thereby preventing the contents from being discharged externally by the head part partially pressed.

Additionally, the contents container according to the present invention can prevent the head part from being exposed during assembly and transportation, thereby preventing unnecessary interference and damage to the head part.

In addition, the inner container assembly and the outer container assembly can be coupled regardless of relative rotational positions thereof, so the production and assembly processes are simplified due to the non-directional fastening structure, and there is no need to finely align the relative rotational positions of the inner container assembly and the outer container assembly during the refilling process of the inner container assembly, thereby facilitating refilling.

DESCRIPTION OF DRAWINGS

Brief descriptions of the drawings referred to in the detailed description of the present invention are provided to better understand the drawings.

MODE FOR INVENTION

Hereinafter, exemplary embodiments according to the present invention are described in detail with reference to the accompanying drawings. Moreover, methods of constructing and using devices according to embodiments of the present invention are described in detail with reference to the contents stated in the accompanying drawings. The same reference numbers or symbols in each drawing indicate parts or components that perform substantially the same functions. For convenience in description, the directions of up, down, left, and right are based on the drawings, and the scope of the present invention is not necessarily limited by the directions.

Terms including ordinals such as "first" and "second" are used to describe various components but are not intended to limit the components. The terms are used only to distinguish one component from another. For example, without departing from the scope of the present invention, a "first component" could be named a "second component," and similarly, a "second component" might also be called a "first component." The terms "and/or" include any and all combinations of one or more of associated listed items.

Terms used in the present specification are for the purpose of describing specific embodiments only and are not intended to limit the present invention. The singular forms "a", "an", and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the description of the present invention, to connect some part with another part means that some part is directly connected with another part and that some part is indirectly connected with another part through an element. Furthermore, when a certain part "includes" a certain component, other components are not excluded unless explicitly described otherwise, and other components may in fact be included.

Figure 1:
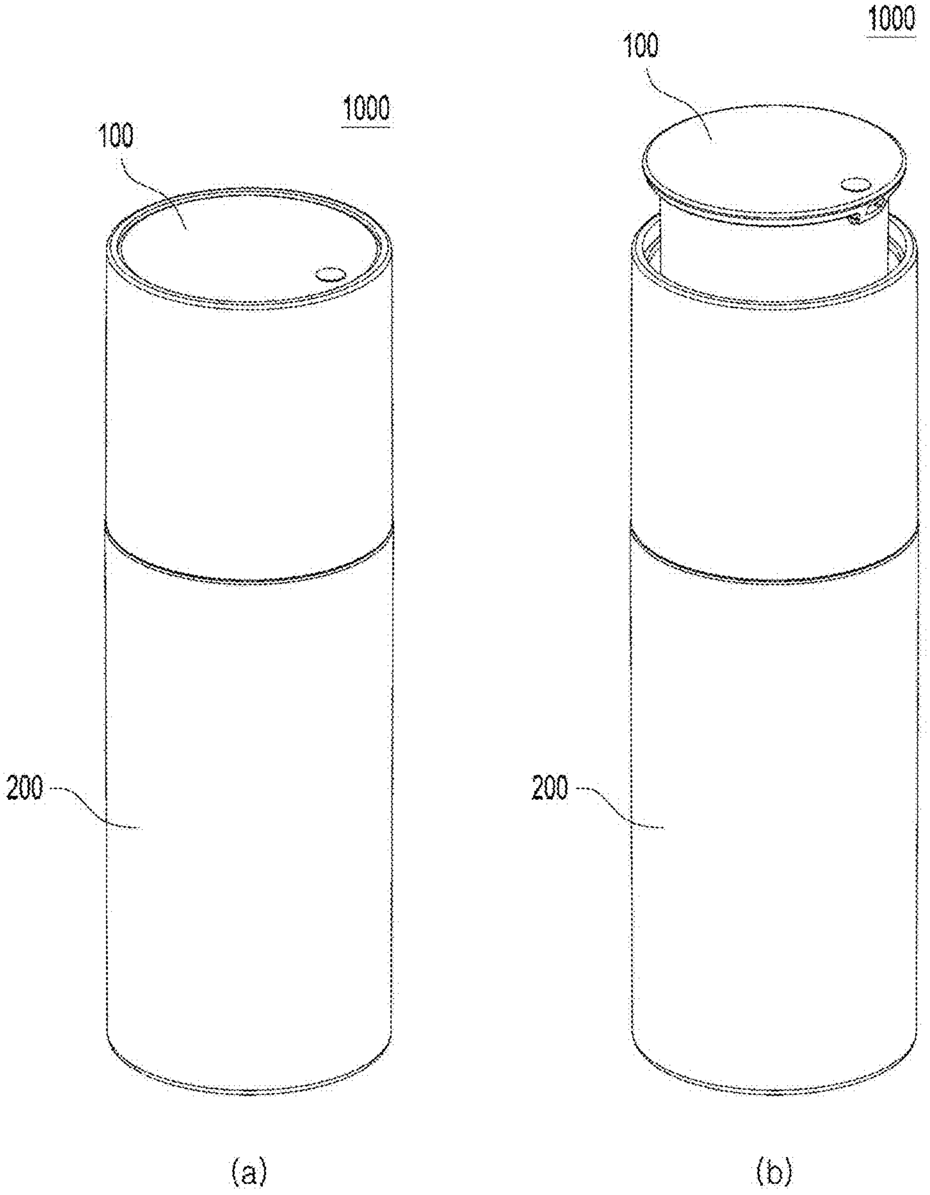
FIG. 1 is a perspective view of a contents container according to an embodiment of the present invention.
Figure 2:
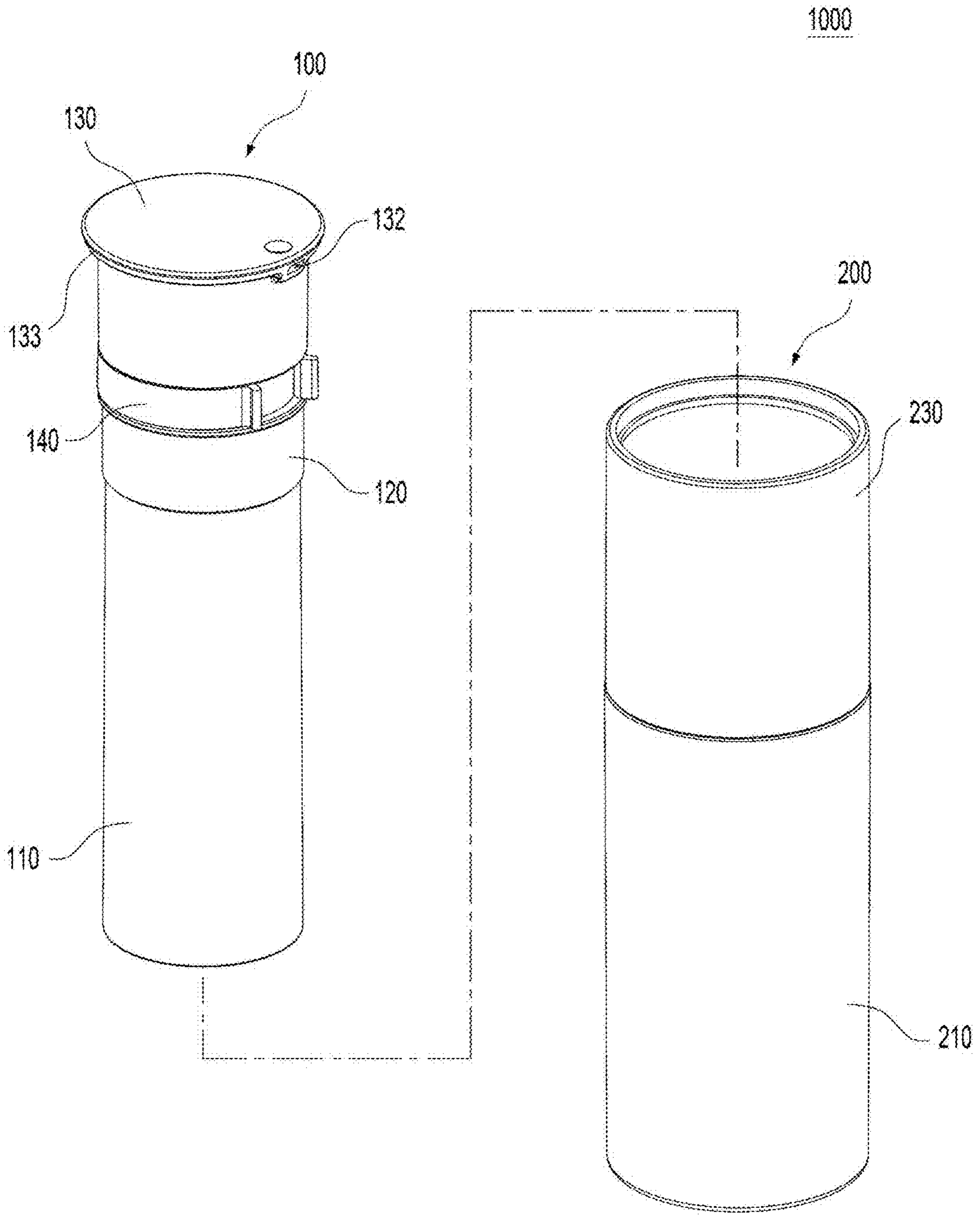
FIG. 2 is an exploded perspective view of the contents container according to an embodiment of the present invention.
Figure 3:
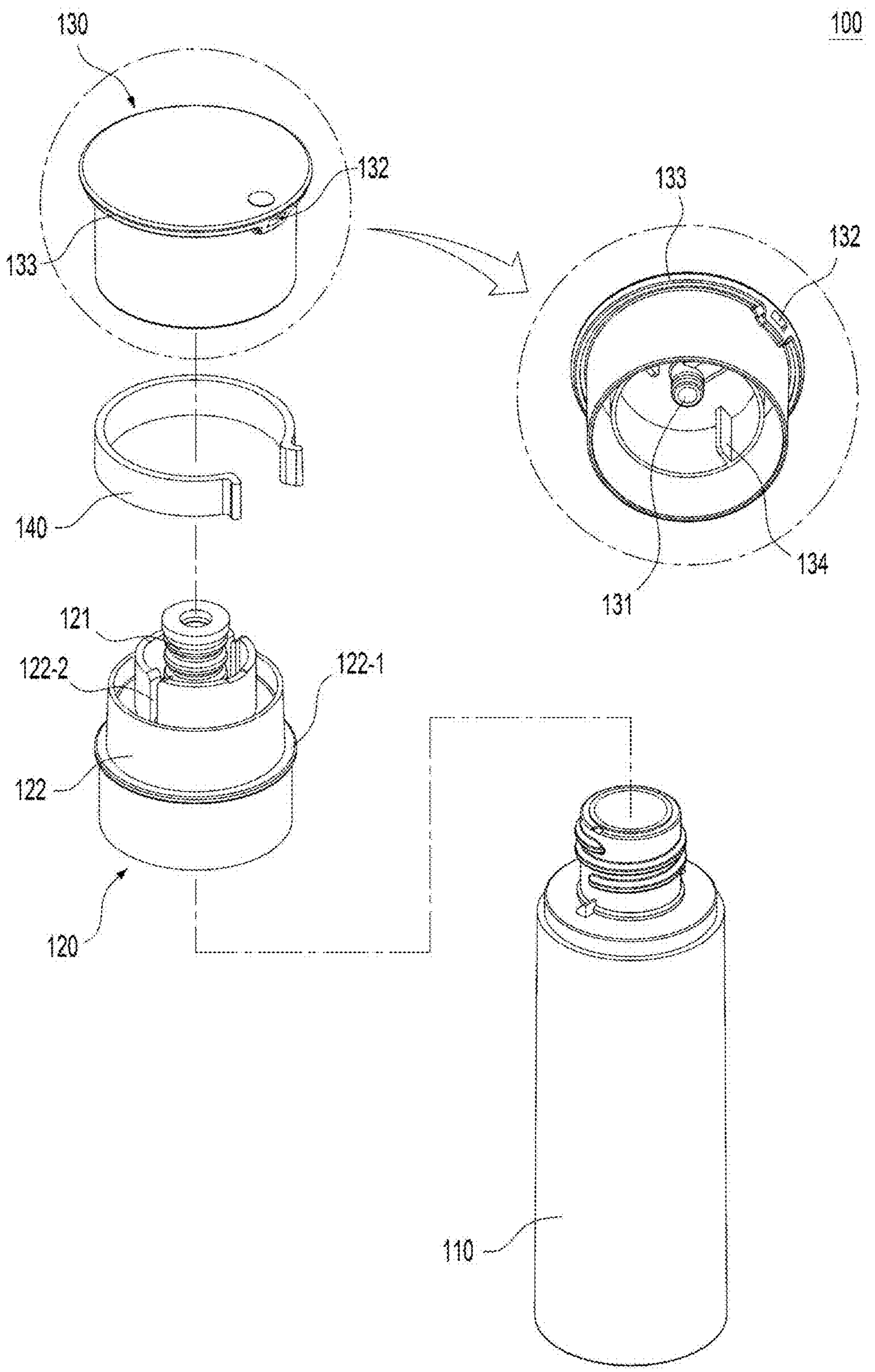
FIG. 3 is an exploded perspective view of an inner container assembly according to an embodiment of the present invention.
Figure 4:
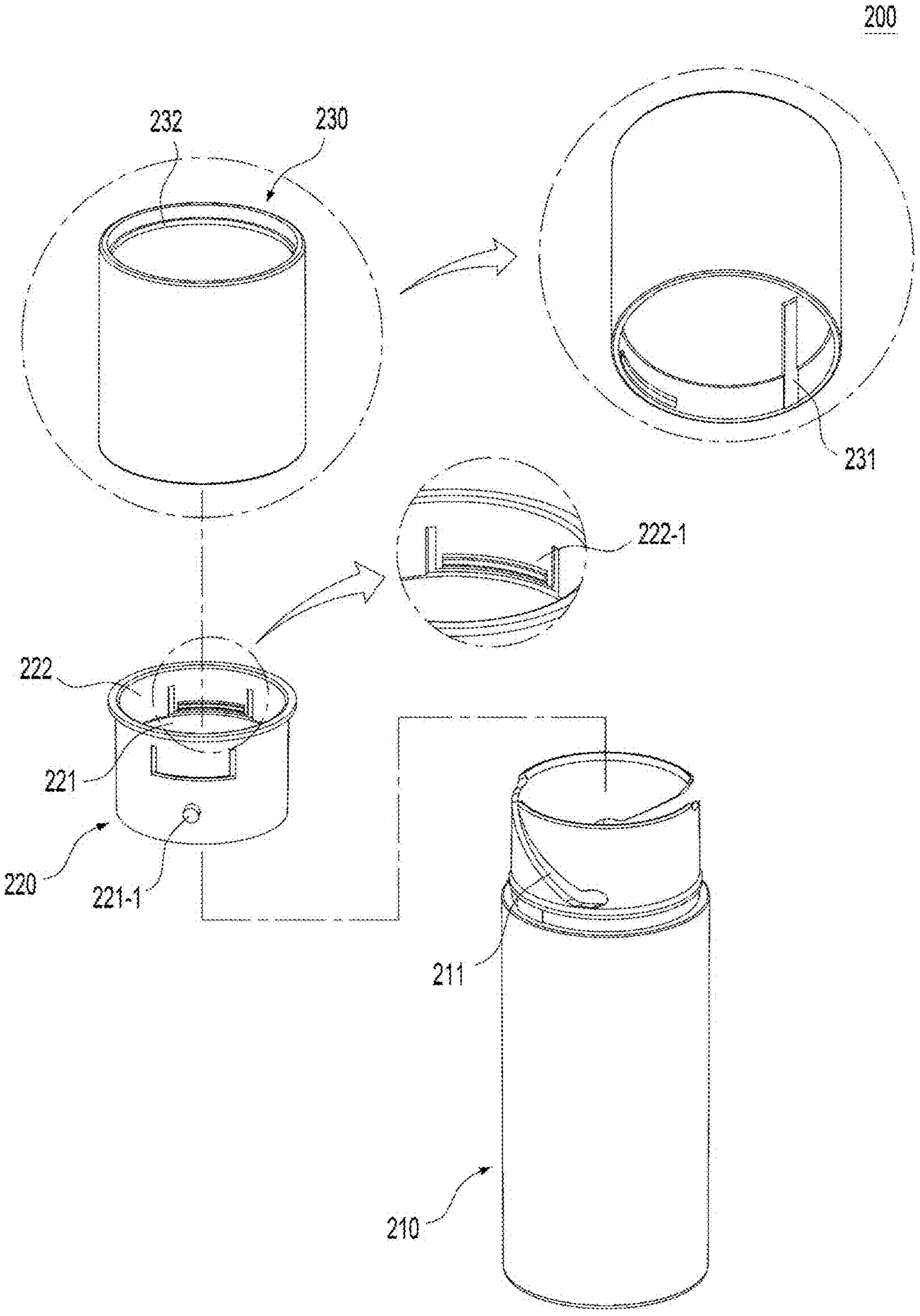
FIG. 4 is an exploded perspective view of an outer container assembly according to an embodiment of the present invention.
Figure 5:
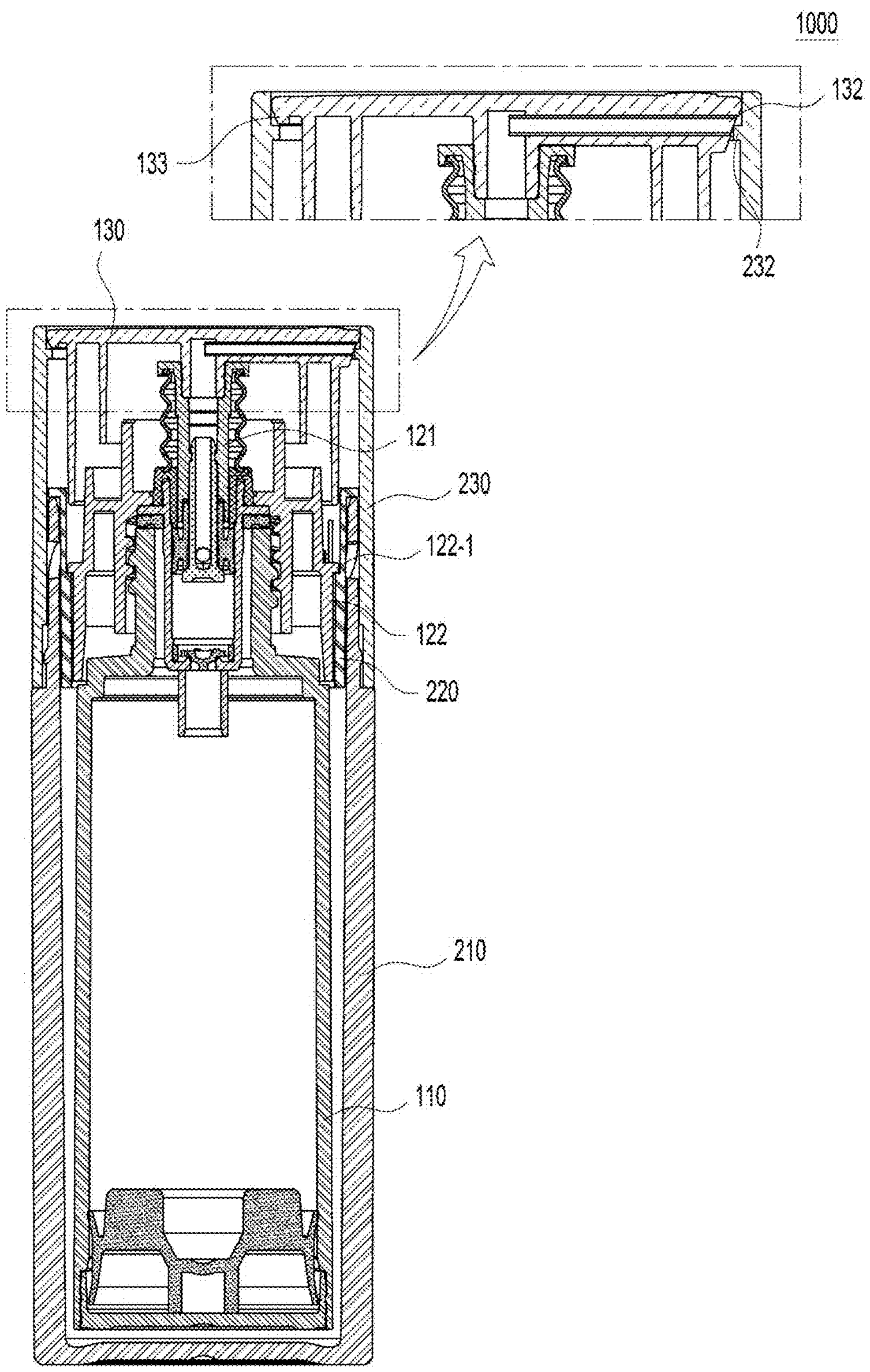
FIG. 5 is a sectional view of the contents container according to an embodiment of the present invention.
Figure 6:
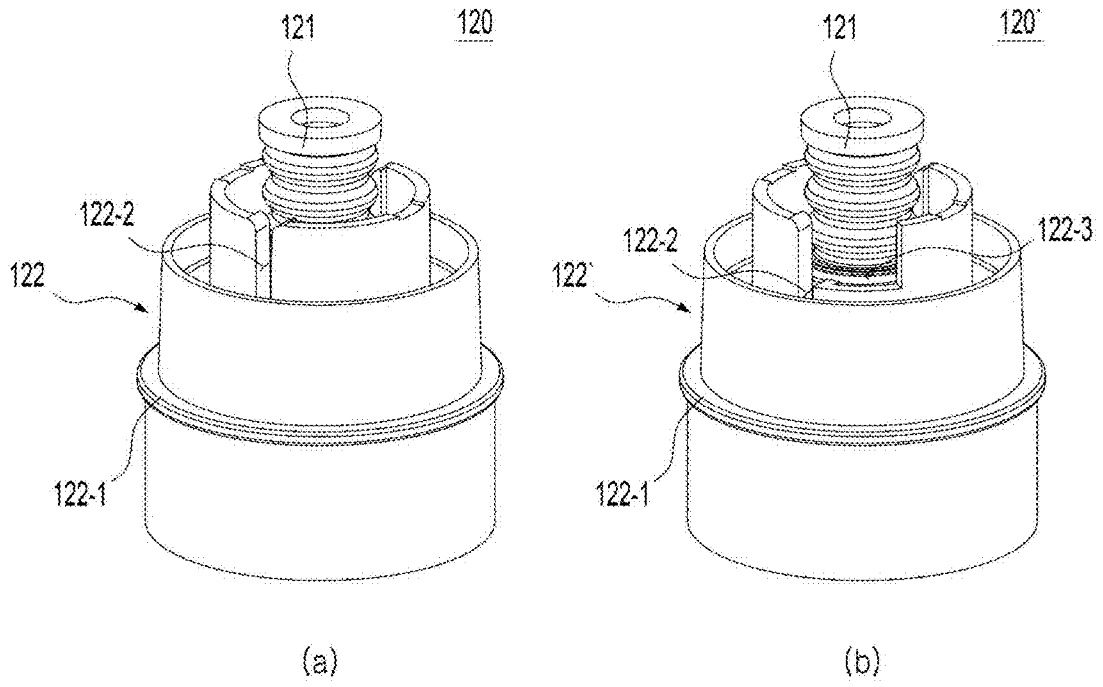
FIG. 6 is a view for depicting various examples of the inner container assembly of the present invention.

FIG. 1 is a perspective view of a contents container according to an embodiment of the present invention, FIG. 2 is an exploded perspective view of the contents container according to an embodiment of the present invention, FIG. 3 is an exploded perspective view of an inner container assembly according to an embodiment of the present invention, FIG. 4 is an exploded perspective view of an outer container assembly according to an embodiment of the present invention, FIG. 5 is a sectional view of the contents container according to an embodiment of the present invention, and FIG. 6 is a view for depicting various examples of the inner container assembly of the present invention.

Referring to FIGS. 1 through 6, a contents container 1000 can include an inner container assembly 100 and an outer container assembly 200.

The inner container assembly 100 can accommodate contents and discharge the contents externally by pressure. Additionally, the inner container assembly 100 can rise and fall along the outer container assembly 200. While rising and falling along the outer container assembly 200, the inner container assembly 100 can be pressurized or restricted in pressure. In addition, the inner container assembly 100 can be completely separated from the outer container assembly 200 by lifting. Accordingly, while maintaining the outer container assembly 200, the entire inner container assembly 100 can be replaced with a new inner container assembly 100 for use, thereby facilitating the refilling of the inner container assembly 100.

According to an embodiment, the inner container assembly 100 can be generally formed of the same or similar material. For example, the inner container assembly 100 can be generally formed of plastic materials and may not include metal materials. In this case, the plastic materials may include various kinds of plastic materials, such as polypropylene (PP), polyethylene (PE), polystyrene (PS), polyvinyl chloride (PVC), polyketone (POK), polyetheretherketone (PEEK), polycarbonate (PC), polyoxymethylene (POM), polyethylene terephthalate (PET), polybutylene terephthalate (PBT), and so on, but are not limited thereto and can include all known plastic materials. In this case, the inner container assembly 100 can be easily separated and disposed of from the outer container assembly 200, thereby contributing to environmental protection and enhancing the recycling and reuse rates of packaging.

According to an embodiment, the inner container assembly 100 can be inserted into the outer container assembly 200 by rising (see FIG. 1(*a*)) or can protrude outward from the outer container assembly 200 (see FIG. 1(*b*)). Specifically, for example, the upper surface of the inner container assembly 100 may be located at a height corresponding to the upper surface of the outer container assembly 200, and then protrude above the upper surface of the outer container assembly 200 (by rising when a rotation part 230 is rotated). In this instance, when the inner container assembly 100 is inserted into the outer container assembly 200, pressurization of the inner container assembly 100 can be prevented, and when the inner container assembly 100 protrudes outside the outer container assembly 200, pressurization of the inner container assembly 100 can be allowed.

According to an embodiment, in the state in which the inner container assembly 100 protrudes outside the outer container assembly 200, when the inner container assembly 100 is pressed upward or downward, the inner container assembly 100 and the outer container assembly 200 can be separated from each other. In this case, the inner container assembly 100 with exhausted contents can be easily replaced with a new inner container assembly 100.

According to an embodiment, the inner container assembly 100 may include an inner container 110, a pump assembly 120, and a head part 130.

The inner container 110 can accommodate contents. In this instance, the contents may include, for example, liquid, gel, or powder forms of cosmetics, medicines, or quasi-drugs. For example, the contents may include lotion, milk lotion, moisturizing lotion, nourishing lotion, skin lotion, skin softener, skin toner, astringent, massage cream, nourishing cream, moisturizing cream, whitening essence, tone-up cream, sunscreen, sun cream, sun milk, BB cream, base, foundation, CC cream, concealer, blusher, shading, eyeshadow, eyebrow, eye cream, primer, and so on, but are not limited thereto.

According to an embodiment, the inner container 110 may be formed in the shape of a cylindrical bottle, but is not limited thereto, and can be formed in various other shapes such as a tube, a jar, a dispenser, a compact, and so on.

The pump assembly 120 can move contents by pressure. For example, the pump assembly 120 can be coupled to the inner container 110 to move the contents accommodated therein. Additionally, for example, the pump assembly 120 can be coupled to the outer container assembly 200 and can rise and fall by the outer container assembly 200. The rising and falling of the pump assembly 120 can cause the inner container 110 and the head part 130 to rise and fall together, thereby enabling the entire inner container assembly 100 to rise and fall. The coupling of the pump assembly 120 and the inner container 110, and the coupling of the pump assembly 120 and the outer container assembly 200 can be achieved by various known coupling methods, such as screw fitting, snap fitting, locking fitting, press fitting, and hook fitting.

According to an embodiment, the pump assembly 120 may include a pump part 121 and an undercap 122.

The pump part 121 can be compressed and decompressed by pressure to move contents. For example, the pump part 121 may include: a cylinder which is open at the top and the bottom and has a hollow inside; a sealing part which is at least partially inserted into the cylinder to at least partially seal the top of the cylinder; a seal cap which rises and falls within the cylinder while being in close contact with the cylinder; a piston rod which is surrounded by the seal cap and rises and falls relative to the cylinder; a stem which is coupled to the piston rod and rises and falls with the piston rod; and an elastic member which is provided between the sealing part and the stem to provide an elastic force from the sealing part towards the stem. However, the pump part 121 is not limited thereto and may include all known types of pump structures such as an airless type, a dip tube type, a spray type, and so on.

According to an embodiment, the elastic member of the pump part 121 may be a bellows-type spring with repeating ridges and grooves and with sealed sides. In this case, the stem may have a stem wing which is formed outward on the upper end of the stem to support the upper end of the elastic member, and a downward bent part which is formed downward on an outer end of the stem wing to support the side of the elastic member. Furthermore, the upper surface of the sealing part may have a support groove into which the lower end of the elastic member is inserted to support the lower end and the side of the elastic member. Additionally, at least one air passage may be formed in at least one of the stem wing and the sealing part to alleviate changes in internal pressure during compression and decompression of the elastic member.

According to an embodiment, the pump part 121 can be formed generally of the same or similar material. For example, the pump part 121 can be generally formed of a plastic material and may not include metal materials. Specifically, the elastic member included in the pump part 121 can also be formed of a plastic material. In this case, when the inner container assembly 100 is discarded, there is no need to separately discard only the pump part 121, thereby enhancing the recyclability and the reuse rate of the packaging.

The undercap 122 can connect the pump part 121 to the outer container assembly 200. For example, the undercap 122 can couple internally with the inner container 110 and/or the pump part 121, and externally with the outer container assembly 200 (specifically, the connection part 220).

According to an embodiment, in the state in which the pump assembly 120 and the outer container assembly 200 are coupled with each other, the undercap 122 can restrict the lowering of the pump assembly 120 from at least a portion of the outer container assembly 200 (specifically, the connection part 220) but allow the pump assembly to rise. Accordingly, the inner container assembly 100 can rise due to the rotational operation of the outer container assembly 200 (specifically, outer container assembly 200 during the rotation operation of the rotation part 230), and then, the inner container assembly 100 and the outer container assembly 200 can be separated from each other when the inner container assembly 100 is pressed upward or the outer container assembly 200 is pressed downward.

For example, the undercap 122 may have an undercut 122-1 protrudingly formed. The undercut 122-1, for instance, can be in contact with one side of the outer container assembly 200 (specifically, the inner upper end of the connection part 220). Thus, when at least a portion of the outer container assembly 200 (specifically, the connection part 220) rises (due to the rotation of the rotation part 230), one side of the outer container assembly 200 (specifically, the upper end of a first area 221 of the connection part 220) can press the undercut 122-1 causing the undercap 122 to rise together. The rising of the undercap 122 can cause the inner container assembly 100 to rise generally. Moreover, when the undercap 122 in a raised state presses the inner container assembly 100 upward or presses the outer container assembly 200 downward, since the rise of the undercut 122-1 is not restricted, the outer container assembly 200 can rise, allowing the separation from the inner container assembly 100.

According to an embodiment, the undercut 122-1 can be fitted on one side of the outer container assembly 200 (specifically, the connection part 220) and the undercap 122 and the outer container assembly 200 (specifically, the connection part 220) can be coupled. However, the present invention is not limited to the coupling method. For instance, at least one fitting groove (not shown) may be formed on the outer circumference of the undercap 122, specifically below the undercut 122-1, through which the undercap 122 can be forcedly fit with the outer container assembly 200 (specifically, the connection part 220). Additionally, various other known coupling methods such as screw fitting, locking fitting, and hook fitting can be applied, and multiple coupling methods can be applied simultaneously.

According to an embodiment, at least one gripping part can be formed on the outer side of the undercap 122. During the separation of the inner container assembly 100, a user can grip the gripping part. For example, the undercut 122-1 can act as a gripping part. That is, the user can grip the undercut 122-1 to press the inner container assembly 100 upward or press the outer container assembly 200 downward, thereby separating the inner container assembly 100 from the outer container assembly 200. Additionally, according to an embodiment, the fitting groove formed on the outer side of the undercap 122 can act as a gripping part, or at least one gripping projection can be protrudingly formed on the outer side of the undercap 122, and other various configurations that can be gripped by the user may be alternatively/additionally applied.

The head part 130 can press the pump assembly 120 and discharge the contents externally. Specifically, the head part 130 can receive pressure from the user and press the pump assembly 120. The contents moved by the pump assembly 120 can, for example, flow into the head part 130 through an inlet hole 131 and be discharged externally through a nozzle part 132.

According to an embodiment, the head part 130 can include a wing part 133. The wing part 133 can be in contact with at least a portion of the outer container assembly 200 (specifically, a first limitation protrusion 232) and restrict the lowering of the head part 130, thereby limiting the pressurization of the head part 130. For example, the wing part 133 can be protrudingly formed outwardly from the top of the head part 130, but is not limited thereto, and the wing part 133 can be formed at various positions on the head part 130.

According to an embodiment, the wing part 133 can be continuously formed along the circumference of the head part 130. In this case, all areas of the wing part are in contact with one side of the outer container assembly 200 (specifically, the first limitation protrusion 232) along the circumference of the head part 130, so that the head part 130 does not lower even though any portion is pressed. That is, if a specific area of the head part 130 is pressed in a pressurized limited state, the problem of the head part 130 partially lowering can be overcome.

According to an embodiment, the wing part 133 can be inclined downwardly inwardly. The inclined structure can minimize friction between the wing part 133 and the outer container assembly 200 (specifically, the rotation part 230) during the lifting process of the head part 130. The reduction in frictional force can make the lifting of the inner container assembly 100 smoother and improve the user experience.

According to an embodiment, the nozzle part 132 can be inclined downwardly inward at an angle corresponding to the wing part 133. In this case, when the inner container assembly 100 is fully inserted into the outer container assembly 200 and the wing part 133 is in contact with one side of the outer container assembly 200 (specifically, the first limitation protrusion 232), the nozzle part 132 can be in contact with one side of the outer container assembly 200 (specifically, the first limitation protrusion 232) together with the wing part 133. In this instance, the outer container assembly 200 does not need an insertion part for insertion of the nozzle part 132. Due to the structure, when the inner container assembly 100 and the outer container assembly 200 are fastened, the wing part 133 and the nozzle part 132 will be always simultaneously in contact with one side of the outer container assembly 200 (specifically, the first limitation protrusion 232), so the position of the nozzle part 132 may not affect the insertion depth of the inner container assembly 100. That is, a non-directional fastening structure can be applied to the inner container assembly 100 and the outer container assembly 200.

According to an embodiment, at least one second limitation protrusion 134 can be protrudingly formed on the inside of the head part 130. The second limitation protrusion 134 can guide the lifting path of the head part 130 or limit the pressurization of the head part 130.

In one embodiment, the second limitation protrusion 134 can guide the lifting path of the head part 130. In this case, the pump assembly 120, specifically the undercap 122, can have a first movement groove 122-2 forming the lifting path of the second limitation protrusion 134 (see FIG. 6(*a*)). The first movement groove 122-2 may be perpendicular to the cross-section of the pump assembly 120, but is not limited thereto. In this case, when the head part 130 is pressurized, the second limitation protrusion 134 moves along the first movement groove 122-2 to guide the lifting path of the head part 130.

In another embodiment, the second limitation protrusion 134 can limit the pressurization of the head part 130. More specifically, the head part 130 is rotated to change the position of the second limitation protrusion 134, allowing adjustment of pressurization limitation of the head part 130. In this case, a pump assembly 120', specifically a undercap 122', can include a first movement groove 122-2 and a second movement groove 122-3 forming the rotational path of the second limitation protrusion 134 (see FIG. 6(*b*)). In this instance, the first movement groove 122-2 may be perpendicular to the cross-section of the pump assembly 120, and the second movement groove 122-3 may be parallel to the cross-section of the pump assembly 120, but the present invention is not limited thereto. When the second limitation protrusion 134 is positioned at the top of the first movement groove 122-2, pressurization of the head part 130 is allowed, and when positioned at the top of the second movement groove 122-3, pressurization of the head part 130 can be limited. Accordingly, the pressurization of the head part 130 can be allowed within a first rotation range relative to the pump assembly 120', and limited within a second rotation range. More specifically, when the head part 130 is within the first rotation range, the second limitation protrusion 134 can rise along the first movement groove 122-2 to allow the lowering of the head part 130, thus allowing the pressurization of the head part 130. Furthermore, when the head part 130 is within the second rotation range, the bottom of the second limitation protrusion 134 gets in contact with the bottom of the second movement groove 122-3 to limit the descent of the head part 130, thereby limiting the pressurization of the head part 130. That is, when the head part 130 is within the second rotation range, it can prevent unintended pressurization of the head part 130 causing discharge of contents by the head part 130.

According to an embodiment, the pressurization of the head part 130 may be limited until the first use of the inner container assembly 100. For this purpose, a stopper 140 may be provided between the head part 130 and the pump assembly 120. The stopper 140 can be in contact with the bottom of the head part 130 and one side of the pump assembly 120 (particularly, the top of the undercap 122-1), thereby preventing unintended pressurization of the head part 130. The stopper 140 may be attached at the time of initial provision of the inner container assembly 100 and can be removed just before coupling the inner container assembly 100 with the outer container assembly 200.

According to an embodiment, when the stopper 140 is provided between the head part 130 and the inner container 110, the second movement groove 122-3 may not be provided or may be provided, but the present invention is not limited thereto, and various embodiments including both can be applied.

The outer container assembly 200 can accommodate the inner container assembly 100 internally. Additionally, at least a portion of the outer container assembly 200 can be rotated to raise the inner container assembly 100.

According to an embodiment, the outer container assembly 200 may include an outer container 210, a connection part 220, and a rotation part 230.

The outer container 210 can be configured to surround at least a portion of the inner container assembly 100, specifically at least a portion of the inner container 110. Accordingly, the inner container 110 can be protected from external impacts and insulation properties of the inner container 110 may be enhanced.

The connection part 220 can connect the outer container 210 with the inner container assembly 100. For example, the connection part 220 can couple internally with the undercap 122 of the pump assembly 120 and externally with the outer container 210, thus connecting the outer container 210 and the inner container assembly 100. Additionally, the connection part 220 can rise and fall along the outer container 210 (during the rotation of the rotation part 230). The rise and fall of the connection part 220 can also cause the pump assembly 120 coupled with the connection part 220 to rise and fall. Thus, the rise and the fall of the connection part 220 can facilitate the rise and the fall of the inner container assembly 100.

According to an embodiment, the first area 221 of the lower side of the connection part 220 can protrude inwardly compared to the second area 222 of the upper side. In this case, the upper end of the first area 221 can be in contact with the lower end of the undercut 122-1.

According to an embodiment, at least one locking protrusion 222-1 can be formed on the inside of the connection part 220, namely, the inside of the second area 222. In this case, the lower end of the undercut 122-1 may be in contact with the upper end of the first area 221, and the upper end may be in contact with the locking protrusion 222-1, thereby facilitating the coupling of the connection part 220 and the inner container assembly 100. The locking protrusion 222-1 may be elastically deformed outwardly by an external force. For example, if the undercut 122-1 is pressurized upward and the external force is applied to the locking protrusion 222-1, the locking protrusion 222-1 may be elastically deformed outwardly, allowing the undercut 122-1 to rise. That is, the lowering of the undercut 122-1 is restricted by the first area 221, but the rise of the undercut 122-1 can be partially allowed by the elastic deformation of the locking protrusion 222-1. Such a structure allows the undercut 122-1 to rise due to the connection part 220 during the rotational operation of the rotation part 230, so that the inner container assembly 100 can rise from the outer container assembly 200. Subsequently, when the inner container assembly 100 is pressurized upward or the outer container assembly 200 is pressurized downward, the locking protrusion 222-1 is elastically deformed and the undercut 122-1 rises, enabling the separation of the inner container assembly 100 from the outer container assembly 200.

According to an embodiment, to facilitate the coupling of the undercap 122 and the connection part 220, at least one fitting protrusion (not illustrated) that fits into the fitting groove of the undercap 122 can be formed on the connection part 220. However, the present invention is not limited to the coupling method, and various other coupling methods such as screw fitting, locking fitting, etc., can be applied.

The rotation part 230 can rotate by the user's rotational operation and can raise the inner container assembly 100. Specifically, the rotation part 230 can raise the connection part 220 by rotational operation, and consequently, the inner container assembly 100 connected to the connection part 220 can be raised. For example, as the rotation part 230 is coupled to the outside of the outer container 210 and/or the connection part 220, the rotation part 230 can receive the user's rotational operation and raise the connection part 220.

According to an embodiment, the outer container 210 may include at least one first guide groove 211, the rotation part 230 may include at least one second guide groove 231, and the connection part 220 may include at least one guide protrusion 221-1 which is inserted into the first guide groove 211 and the second guide groove 231. As the rotation part 230 rotates, the guide protrusion 221-1 moves along the first guide groove 211 and the second guide groove 231, thereby allowing the connection part 220 to rise and fall along the outer container 210. More specifically, when the rotation part 230 rotates, the second guide groove 231 rotates and pressurizes the guide protrusion 221-1 in the rotational direction to rotate the guide protrusion 221-1 such that the guide protrusion 221-1 can move along the first guide groove 211. When the guide protrusion 221-1 moves along the first guide groove 211, the connection part 220 can rise and fall along the outer container 210.

According to an embodiment, the first guide groove 211 may be formed in a spiral direction relative to the cross-section of the outer container 210, and the second guide groove 231 may be formed in a perpendicular direction relative to the cross-section of the rotation part 230. In this case, when the rotation part 230 rotates, the guide protrusion 221-1 moves in the spiral direction along the first guide groove 211, allowing the connection part 220 and the inner container assembly 100 to rotate and rise. However, the present invention is not limited thereto, and various embodiments can be applied, such as the first guide groove 211 being formed in the perpendicular direction and the second guide groove 231 in the spiral direction.

According to an embodiment, a first limitation protrusion 232 can be formed to protrude inwardly along the upper inner surface of the rotation part 230. The first limitation protrusion 232 can be in contact with at least a portion of the inner container assembly 100, especially the lower end of the wing part 133 of the head part 130. Accordingly, when the upper surface of the inner container assembly 100 is located at a height corresponding to the upper surface of the outer container assembly 200, the pressurization of the inner container assembly 100 can be prevented.

According to an embodiment, the first limitation protrusion 232 can be formed along the upper inner surface of the rotation part 230 to generally make contact with the wing part 133. Thus, when the upper surface of the inner container assembly 100 is at a height corresponding to the upper surface of the outer container assembly 200 and the first limitation protrusion 232 and the wing part 133 are in contact with each other, even if any area of the head part 130 is pressurized, the pressurization of the head part 130 may be limited by the first limitation protrusion 232 and the wing part 133.

According to an embodiment, the first limitation protrusion 232 may protrude perpendicularly from the inner circumferential surface of the rotation part 230 without forming a slope, or may be inclined downwardly inward to correspond with the wing part 133 and/or the nozzle part 132. Regardless of the shape, the first limitation protrusion 232 can be in contact with one side of the wing part 133 and/or the nozzle part 132 to prevent the pressurization of the head part 130.

According to an embodiment, an insertion part (not shown) may be formed in an area of the first limitation protrusion 232. For example, the insertion part can be formed by one area of the first limitation protrusion 232 being penetrated vertically or recessed downwardly, and the nozzle part 132 of the inner container assembly 100 can be inserted into the insertion part.

According to an embodiment, an insertion part may not be formed in one area of the first limitation protrusion 232. In this case, for example, the first limitation protrusion 232 may be formed along the entire upper inner surface of the rotation part 230 to be connected ceaselessly. The first limitation protrusion 232 can be in overall contact with the wing part 133 and the nozzle part 132, thereby preventing the lowering of the wing part 133 and the nozzle part 132. The prevention of the lowering is achieved regardless of the relative rotational positions of the head part 130 and the rotation part 230, thereby achieving a non-directional fastening structure between the head part 130 and the rotation part 230, that is, a non-directional fastening structure between the inner container assembly 100 and the outer container assembly 200. The non-directional fastening structure simplifies the production and assembly process and eliminates the need to finely align the relative rotational positions of the inner container assembly 100 and the outer container assembly 200 during the refilling process, thus facilitating refilling and increasing productivity.

FIGS. 1 through 6 illustrate an example of a contents container 1000, and various configurations can be applied according to embodiments to which the present invention is applied.

Figure 7:
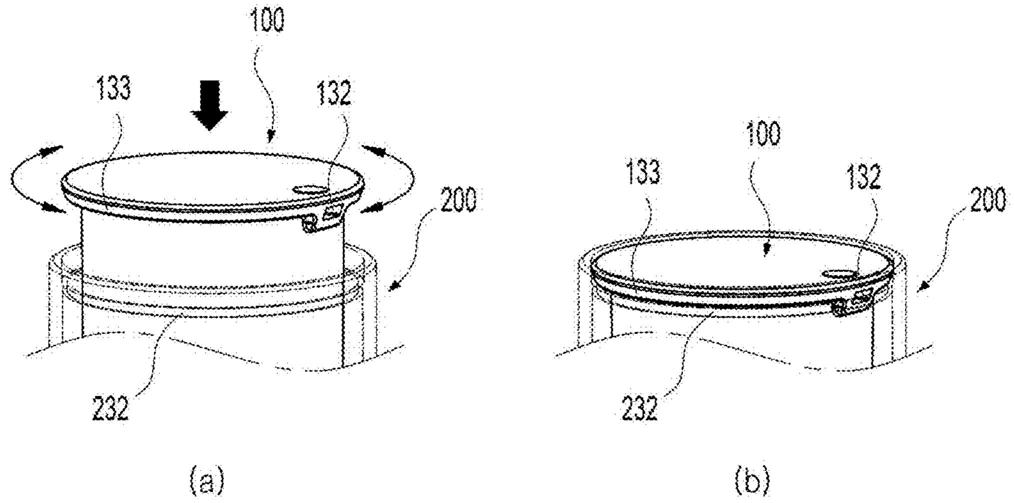
FIG. 7 is a view for depicting a non-directional fastening structure according to an embodiment of the present invention.

FIG. 7 is a view for depicting the non-directional fastening structure according to an embodiment of the present invention.

Referring to FIG. 7, when the inner container assembly 100 is inserted into the outer container assembly 200, the wing part 133, which protrudes outward from the top of the head part 130, gets in contact with the first limitation protrusion 232 protruding from the inner surface of the rotation part 230. At this time, the wing part 133 is formed to incline downward inward, and the nozzle part 132 can also be formed to incline downward inward at an angle corresponding to the wing part 133. In this case, the wing part 133 is in contact with the first limitation protrusion 232, and the nozzle part 132 is also in contact with the first limitation protrusion 232 in the same manner, so the first limitation protrusion 232 may not need an insertion part for insertion of the nozzle part 132.

Accordingly, when the inner container assembly 100 separated from the outer container assembly 200 is inserted into the outer container assembly 200, the wing part 133 and the nozzle part 132 will always simultaneously come into contact with the first limitation protrusion 232, such that the position of the nozzle part 132 does not affect the insertion depth of the inner container assembly 100 and/or whether the lowering is prevented by the first limitation protrusion 232. That is, the non-directional fastening structure can be applied to the inner container assembly 100 and the outer container assembly 200. Due to the non-directional fastening structure, there is no need to accurately align the relative rotational positions of the inner container assembly 100 and the outer container assembly 200 during the production and assembly process, and the refilling process of the inner container assembly 100, thereby increasing productivity and facilitating refilling.

The non-directional fastening structure illustrated in FIG. 7 is exemplary, and various configurations can be applied according to embodiments of the present invention.

Figure 8:
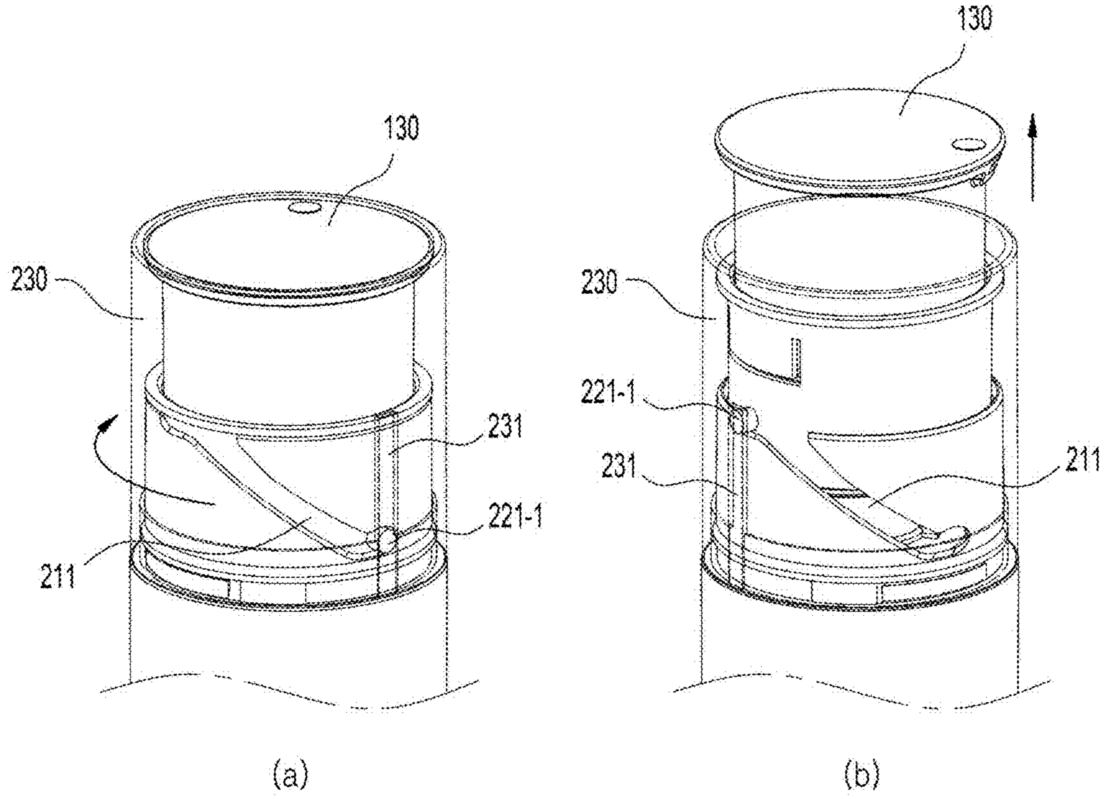
FIG. 8 is a view for depicting a protrusion operation of a head part according to an embodiment of the present invention.

FIG. 8 is a view for depicting a protrusion operation of a head part according to an embodiment of the present invention. For clarity in depicting the internal structure, the rotation part 230 is shown in dashed lines.

Referring to FIG. 8, when the rotation part 230 is rotated, the second guide groove 231 formed perpendicular to the cross-section of the rotation part 230 rotates to pressurize the guide protrusion 221-1 in the rotational direction. Accordingly, the guide protrusion 221-1 can move along the first guide groove 211 formed in a spiral direction relative to the cross-section of the outer container 210. As the guide protrusion 221-1 moves along the first guide groove 211, the connection part 220 can perform a rotational rise along the outer container 210. The rise of the connection part 220 can cause the connected inner container assembly 100 to also rise, thereby allowing the head part 130 to protrude from or be inserted into the outer container assembly 200.

The protrusion operation of the head part illustrated in FIG. 8 is exemplary, and various methods can be applied according to embodiments to which the present invention is applied.

Figure 9:
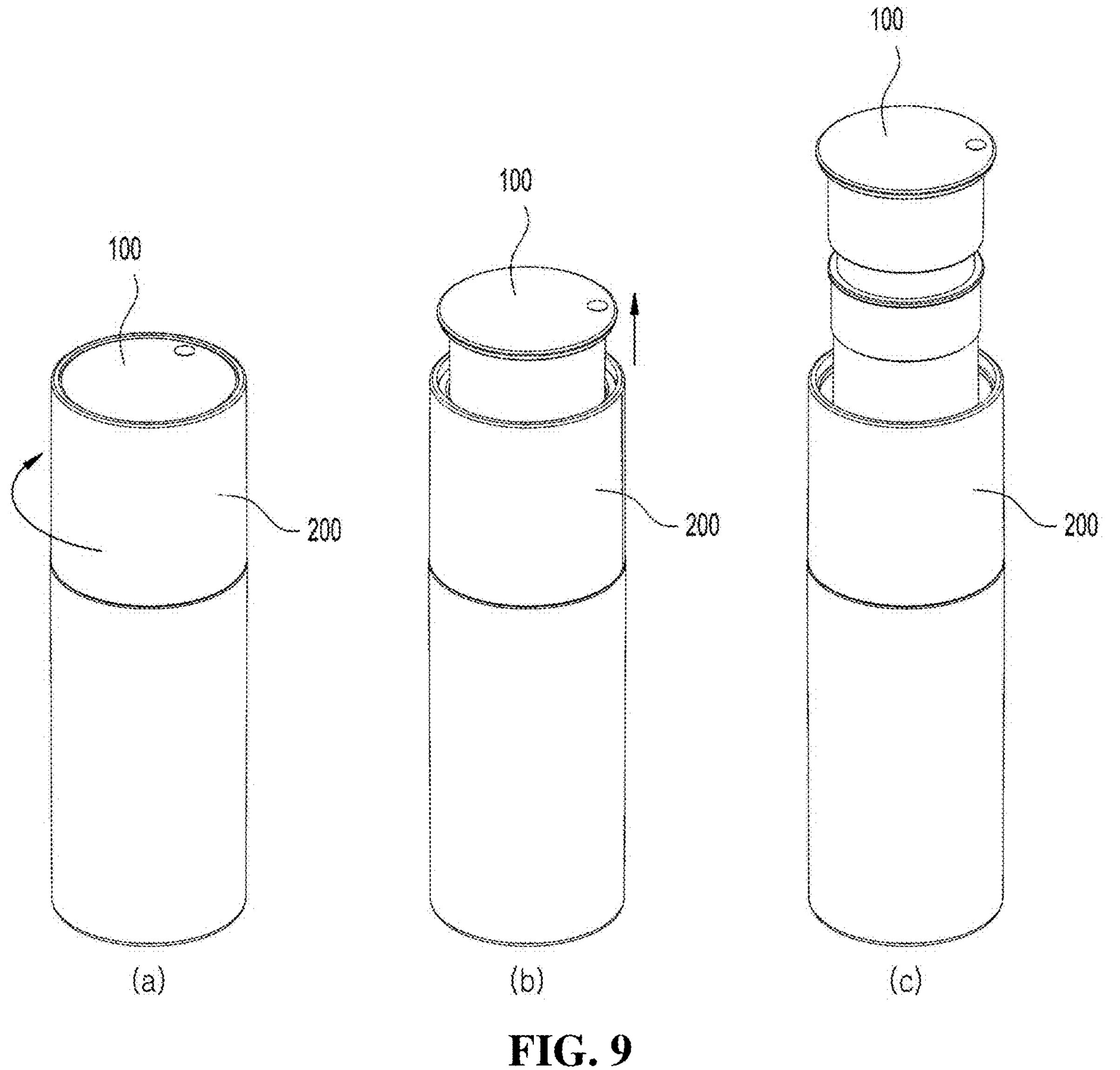
FIG. 9 is a view for depicting the overall usage method of the contents container according to an embodiment of the present invention.

FIG. 9 is a view for depicting the overall usage method of the contents container according to an embodiment of the present invention.

Referring to FIG. 9, when the rotation part 230 is rotated in one direction, the connection part 220 is raised by the rotation part 230, and the pump assembly 120 coupled with the connection part 220 is also raised, so the inner container assembly 100 can be raised. In this case, the inner container assembly 100 can protrude outward of the outer container assembly 200, and the pressurization limitation of the head part 130 by the first limitation protrusion 232 can be released. The user can compress the pump assembly 120 by pressing the head part 130, thereby discharging the contents outward through the nozzle part 132.

Thereafter, when the user presses the inner container assembly 100, which protrudes outward of the outer container assembly 200, upward or presses the outer container assembly 200 downward, the inner container assembly 100 and the outer container assembly 200 can be separated from each other. In this instance, the user can separate the inner container assembly 100 and the outer container assembly 200 more easily by grasping the undercut 122-1 of the inner container assembly 100. Therefore, only the inner container assembly 100 with the exhausted contents can be easily replaced with a new one while maintaining the outer container assembly 200, thereby facilitating refilling of the inner container assembly 100.

The usage method illustrated in FIG. 9 is exemplary, and various methods can be applied according to embodiments to which the present invention is applied.

As described above, optimal embodiments have been presented in the drawings and specification. Specific terms are used herein only for the purpose of description of the present invention, not for limiting the meaning or the scope of the present invention described in the claims. Therefore, it will be understood by those of ordinary skill in the art that various changes and equivalents may be made without departing from the scope of the present invention. Thus, the true technical protection scope of the present invention should be determined by the technical spirit of the appended claims.

The invention claimed is:

1. A contents container comprising:

an inner container assembly configured to accommodate contents and discharge the contents by pressure; and an outer container assembly configured to accommodate the inner container assembly, the outer container assembly including:

an outer container configured to surround at least a portion of the inner container assembly;

a connection part connecting the outer container and the inner container assembly, and configured to move the inner container assembly longitudinally by moving along the outer container when rotated; and a rotation part configured to longitudinally move the connection part through a rotation operation, wherein a first end of the inner container assembly is located at a height aligned with a first end of the outer container assembly, wherein the inner container assembly includes:

a wing part extending continuously around an outer circumferential surface of the first end of the inner container assembly, the wing part protruding from the outer circumferential surface and inclining inwardly toward a second end of the inner container assembly disposed opposite the first end; and a nozzle part configured to discharge the contents, and inclining inwardly at an angle corresponding to an inclination angle of the wing part.

2. The contents container according to claim 1, wherein when the rotation part is rotated, the first end of the inner container assembly protrudes above the first end of the outer container assembly.

3. The contents container according to claim 2, wherein a first limitation protrusion configured to contact a lower end of the wing part protrudes along an inner surface of a first end of the rotation part.

4. The contents container according to claim 1, wherein the outer container includes at least one first guide groove, the rotation part includes at least one second guide groove, and the connection part includes at least one guide protrusion inserted into the at least one first guide groove and the at least one second guide groove.

5. The contents container according to claim 4, wherein during the rotation of the rotation part, the at least one guide protrusion moves along the at least one first guide groove and the at least one second guide groove to move the connection part longitudinally along the outer container.

6. The contents container according to claim 4, wherein the at least one first guide groove extends in a spiral direction relative to a cross-section of the outer container, and the at least one second guide groove extends in a perpendicular direction relative to a cross-section of the rotation part.

7. The contents container according to claim 1, wherein the inner container assembly comprises:

an inner container accommodating the contents;

a pump assembly moving the contents by pressurization; and a head part discharging the contents externally.

8. The contents container according to claim 7, further comprising:

a stopper positioned between the head part and the pump assembly to prevent pressurization of the head part.

9. The contents container according to claim 7, wherein the pump assembly comprises:

a pump part which is compressed and decompressed by pressurization to move the contents; and an undercap which connects the pump part to the outer container assembly.

10. The contents container according to claim 9, wherein an undercut configured to contact with one side of the connection part is disposed on an outer side of the undercap.

11. The contents container according to claim 10, wherein the inner container assembly is separable from the outer container assembly by gripping the undercut.

12. The contents container according to claim 1, wherein the inner container assembly includes a same material throughout.

13. The contents container according to claim 7, wherein the wing part extends continuously around an entire circumference of an upper surface of the head part to prevent the head part from partially descending when pressure is applied to a specific area of the upper surface of the head part.

14. The contents container according to claim 3, wherein the first limitation protrusion extends continuously along the inner surface of the rotation part at a position corresponding to the wing part of the inner container assembly, enabling the inner container assembly and the outer container assembly to be coupled at any relative rotational position.

15. The contents container according to claim 10, wherein the undercut includes a protruding ridge extending continuously along an entire outer circumference of the undercap.

16. The contents container according to claim 15, wherein the connection part includes at least one locking protrusion on an inner surface thereof to support the undercut, and wherein the at least one locking protrusion is configured to elastically deform outwardly in response to an external force to facilitate separation of the inner container assembly from the outer container assembly.

17. The contents container according to claim 12, wherein the inner container assembly includes a single plastic material.

18. The contents container according to claim 7, wherein the pump assembly includes an elastic member comprising a plastic bellows-type spring.

* * * * *